Dec. 4, 1934.   J. L. BENNETT   1,982,629
EXTENSION HANDLE
Filed April 14, 1932
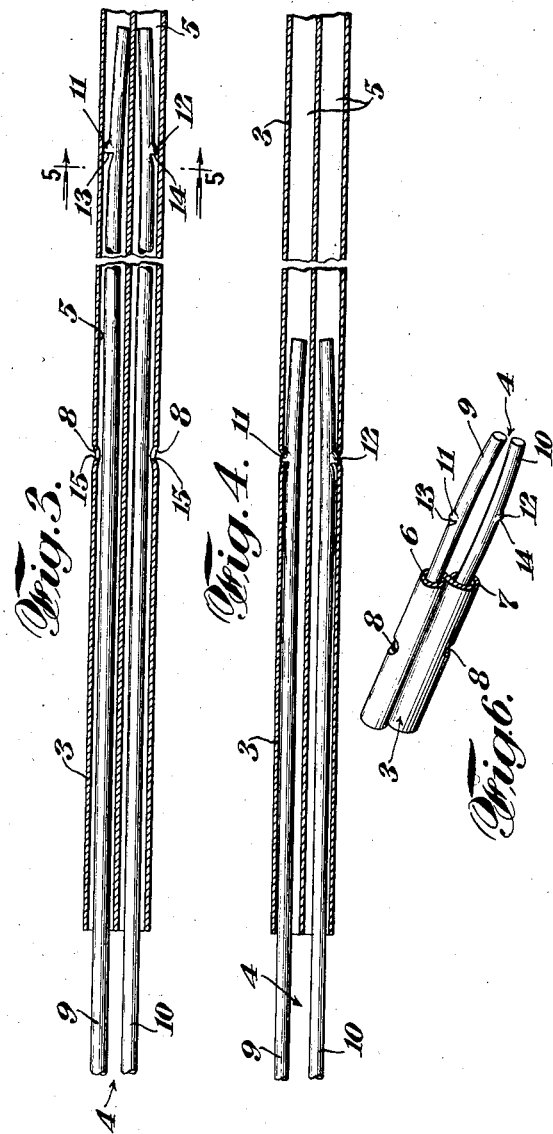
INVENTOR
John L. Bennett
BY
Prindle Bean & Mann
ATTORNEYS

Patented Dec. 4, 1934

1,982,629

UNITED STATES PATENT OFFICE 1,982,629

EXTENSION HANDLE

John L. Bennett, Decatur, Ill., assignor to U. S. Manufacturing Corporation, Decatur, Ill., a corporation of Illinois Application April 14, 1932, Serial No. 605,215

6 Claims. (Cl. 43—137)

This invention relates to improvements in extension handles adapted for use with utensils and implements of various kinds, including fly swatters, forks and culinary and other utensils.

The principal object of this invention is the provision of such a handle construction which may be readily moved to various extended positions, but the parts of which engage with sufficient friction to properly hold the handle in such extended positions, which is strong in construction so as to afford a proper support in any position and which is sufficiently rigid as well as resilient to function efficiently.

A further object of the invention includes the provision of such a device in which the two parts of the handle are provided with cooperating friction elements and also a locking device which limits the extension movement of the handle but permits the telescoping movement of the same.

Further objects of the invention include the provision of such a device which is composed of few parts of simple construction and which may be cheaply and quickly made on a production basis.

To the accomplishment of the foregoing and such other objects as may hereinafter appear, this invention consists in the construction, combination and arrangement of parts hereinafter described and set forth in the appended claims, reference being had to the accompanying drawing which discloses one embodiment of this invention, it being expressly understood, however, that various changes may be made in practice within the scope of the claims without digressing from my inventive idea.

In the drawing—

Figure 1 is a perspective view of one form of this invention shown in connection with a utensil, such as a fly swatter, the parts being shown in telescoped or non-extended position.

Figure 2 is a view similar to Figure 1, the parts being shown in an extended position.

Figure 3 is an enlarged cross sectional view of portions of the two parts of the handle shown in telescoped or non-extended position.

Figure 4 is a view similar to Figure 3 showing portions of two parts of the handle in their fully extended and locked position.

Figure 5 is a vertical transverse cross section taken substantially on line 5—5 of Figure 3.

Figure 6 is a perspective view, parts being shown in section illustrating further details of construction.

While the drawing illustrates a handle adapted for use with a fly swatter or similar implement or utensil, shown in dotted lines, it is of course, understood that this construction is adapted to and may be used in connection with many other articles, devices or implements.

The numeral 1 designates the fly swatter body which is representative of any utensil or implement with which the handle construction is adapted to be used, and the numeral 2 represents the grip applied or secured to the other end of the handle. The handle member is composed of two parts, one of the parts designated 3, having the grip member 2 secured to one end thereof and the other part, designated 4, having the fly swatter body or other implement formed or secured thereto.

The handle part 3 is preferably formed of sheet metal, formed so as to provide two tubular openings or passages 5 therethrough. In the form of my invention illustrated in Figures 5 and 6, the handle part 3 is formed of sheet metal bent in the substantial form of a figure 8 in cross section so as to provide a pair of elongated parallel tubular parts 6 and 7. The tubular parts are separated by the partition or dividing member of the figure 8. This construction forms a rigid handle part which will not twist or distort in use. Each of these tubular parts is provided with an aperture or opening 8 which forms a stop or abutment in the tube. These openings 8 are preferably located near the end of the handle part 3 removed from the grip 2. It is to be noted that the tubular members 6 and 7 are not exactly circular in cross section and the purpose of this will be explained hereafter.

The other part 4 of the handle member is preferably in the form of a pair of wires or rods 9 and 10 which may be substantially circular in cross section, though of course both the cross sections of the wires or rods and that of the tubular elements 6 and 7 may vary, if desired. These wires or rods 9 and 10 are adapted to slidably fit within the tubular elements 6 and 7 and are also adapted to have the utensil or implement attached to or formed upon the other end thereof. Near the opposite end these wires or rods are burred or struck up as at 11 and 12 so as to provide shoulders or detents 13 and 14. These struck-up portions are adapted to engage the inner surface of the tubular elements 6 and 7 with sufficient friction to hold the two parts in any adjusted position and the shoulders or detents 13 and 14 are adapted to engage the stop or abutment provided by the wall of the openings or apertures 8 so as to limit the extended movement of the parts relative to each other.

It is to be particularly noted that the wall of each tubular element 6 and 7 adjacent the opening or aperture 8 is forced or pressed inwardly as at 15 so as to provide an inwardly extended stop or abutment located in the path of movement of the shoulders or detents 13 and 14 to insure a positive lock against the complete withdrawal of the part 4 from within the part 3.

It is also to be understood that normally the two rods or wires 9 and 10 are slightly bent or bowed so as to increase the frictional contact between the parts in being moved or adjusted to various positions. This bow or bend and the provision of the shoulders or detents results in the effective cross section of the wires or rods 9 and 10 becoming elongated and unsymmetrical in one direction which is the reason why the internal openings through the tubular members 6 and 7 are not exactly circular and are unsymmetrical.

In the form of handle member shown in Figures 1 and 2, the wires or rods 9 and 10 form part of a single member which is provided with a closed triangular portion 16 at its end to which the fly swatter body is suitably connected. It is understood that this is merely one of the forms for this handle member.

It is therefore seen that this handle construction is composed of few parts, readily assembled, simple and strong in construction, and easily extended or adjusted to various lengths. The opposing shoulders or detents provided by burring or striking up the rods or wires 9 and 10 and by notching and depressing part of the wall of the tubular members 6 and 7 insure a substantial and positive lock preventing the two parts from becoming entirely disengaged when moving the parts to extended position and also provides sufficient resistance to the proper and desired collapsing movement of the two parts.

What I claim is:

1. An extension handle construction, including a main handle part in the form of a double tube provided with a dividing member, said double tube and dividing member forming a reinforced construction, said double tube having a stop formed near the end of each tube, an extension handle member provided with two parts slidably mounted in said double tube, each of said parts having a shoulder struck up so as to frictionally engage the walls of said double tube during movement and so as to snap into engagement with said stop so as to positively prevent and limit the extension movement of the two parts relative to each other.

2. An extension handle construction, including a main handle part in the form of a double tube provided with a dividing member, said double tube and dividing member forming a reinforced construction, each of said tubes having an aperture provided near one end thereof to form a stop, an extension handle part provided with two members, one slidably mounted within each of said tubes, each of said extension members having a portion struck up near one end thereof to form a shoulder to frictionally engage the inner wall of said tubes during relative movements of the parts and also to snap into said openings and engage said stops to limit the extension movement of said parts relative to each other.

3. An extension handle construction, including a main handle part formed of a single metallic piece bent in the form of the figure 8 in cross section so as to provide a pair of parallel tubes, the figure 8 construction adding rigidity to said main handle part, the wall of each tube being apertured near one end thereof so as to form a stop in the tube, an extension handle part including two wires or rods slidably fitting within said tubes and each having a shoulder near one end thereof adapted to frictionally engage the interior surface of said tubes and also to engage said stops to limit the extension movement of said parts.

4. An extension handle construction, including a main handle part formed of a single metallic piece bent in the form of the figure 8 in cross section so as to provide a pair of parallel tubes, the figure 8 construction adding rigidity to said main handle part, the wall of each tube being apertured near one end thereof and also depressed so as to form a stop in the tube, an extension handle part including two wires or rods slidably fitting within said tubes and each having a shoulder near one end thereof adapted to frictionally engage the interior surface of said tubes and also to engage said stops to limit the extension movement of said parts.

5. An extension handle construction including a main handle part formed of a tube having an aperture in the wall thereof near one end, part of the wall adjacent the aperture being depressed, an extension handle part slidably mounted within said tube and provided with a struck-up shoulder near one end thereof adapted to frictionally engage the wall of said tube so as to hold the parts in various adjusted positions and also adapted to engage in said aperture to limit the extension of said parts relative to each other, and said shoulder and said stop being so arranged as not to interfere with the ready telescopic movement of the parts.

6. An extension handle construction including a main handle part formed with a pair of tubes unsymmetrical in cross section, the wall of each tube having an aperture near one end to provide a stop within the tube, an extension handle part including a pair of rods or wires symmetrical in cross section and slidably mounted within said tubes, each wire or rod having a portion struck up near one end thereof to provide a shoulder adapted to frictionally engage the inner surface of its tube and also to engage the stop to limit the extension movement of the parts with respect to each other, said unsymmetrical form of said tubes and said shoulders or said wires or rods cooperating to increase the friction between the parts.

JOHN L. BENNETT.